(12) United States Patent
Sohma (10) Patent No.: US 7,649,346 B2
(45) Date of Patent: Jan. 19, 2010

(54) SWITCHING REGULATOR HAVING A NORMAL OPERATIONAL MODE AND A LIGHT-LOAD OPERATIONAL MODE

(75) Inventor: Shohtaroh Sohma, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 382 days.

(21) Appl. No.: 11/716,588

(22) Filed: Mar. 12, 2007

(65) Prior Publication Data

US 2007/0216388 A1     Sep. 20, 2007

(30) Foreign Application Priority Data

Mar. 16, 2006   (JP)   ............... 2006-073402

(51) Int. Cl.
  *G05F 1/56* (2006.01)
  *G05F 1/565* (2006.01)
(52) U.S. Cl. .................. 323/283; 323/284; 323/285
(58) Field of Classification Search .......... 323/282–287
  See application file for complete search history.

(56) References Cited

U.S. PATENT DOCUMENTS 6,826,063 B2 *  11/2004  Ichikawa et al. ............. 363/41

2005/0258808 A1 *  11/2005  Chen et al. .................. 323/222

FOREIGN PATENT DOCUMENTS

| JP | 11-89222 | 3/1999 |
|----|----------|--------|
| JP | 2005-160254 | 6/2005 |

\* cited by examiner

*Primary Examiner*—Jeffrey L Sterrett
*Assistant Examiner*—Fred E Finch, III
(74) *Attorney, Agent, or Firm*—Dickstein Shapiro LLP (57) ABSTRACT

A switching regulator including an inductor and a switching transistor and having a normal operational mode and a light-load operational mode is disclosed. The switching regulator includes an operational mode switching part configured to switch the normal operational mode and the light-load operational mode, and a light-load detection part configured to detect the light-load state of a load. The light-load detection part is configured to detect the light-load state of the load by a change in the voltage at the connection of the switching transistor and the inductor when the switching transistor is OFF. The operational mode switching part is configured to switch the normal operational mode to the light-load operational mode in response to the detection of the light-load state of the load by the light-load detection part.

7 Claims, 6 Drawing Sheets

SWITCHING REGULATOR HAVING A NORMAL OPERATIONAL MODE AND A LIGHT-LOAD OPERATIONAL MODE

BACKGROUND OF THE INVENTION

1. Field of the Invention

The present invention relates to a switching regulator for use in portable devices.

2. Description of the Related Art

In these years, it has been required to save energy also for environmental protection. Devices that use batteries, such as portable devices, are desired to consume less current also in terms of extension of their battery life.

Switching regulators used in such portable devices are known to switch control methods for a light-load time and a heavy-load time. For example, according to one method, reduction in or discontinuity of the inductor current of the inductor of a switching regulator is detected as a light-load time and the control method is switched in response to the detection.

According to this method, a change in the electric potential of, for example, the rectifier diode of the switching regulator is monitored in order to detect a change in the inductor current.

Japanese Laid-Open Patent Application No. 2005-160254 discloses a switching regulator that can extremely reduce loss due to charge and discharge of parasitic capacitors formed between the control electrode and the input and output terminals of a switching device.

According to the conventional switching method, however, there are problems such as increases in the number of circuits and current consumption because analog circuits such as an error amplifier and a comparator are necessary in order to monitor a change in the electric potential.

SUMMARY OF THE INVENTION

Embodiments of the present invention may solve or reduce one or more of the above-described problems.

According to one embodiment of the present invention, there is provided a switching regulator in which one or more of the above-described problems may be solved or reduced.

According to one embodiment of the present invention, there is provided a switching regulator that switches to a light-load operation mode and operates with low current consumption while preventing an increase in the number of circuits.

According to one embodiment of the present invention, there is provided a switching regulator including an inductor and a switching transistor, the switching regulator having a normal operational mode and a light-load operational mode, the switching regulator including an operational mode switching part configured to switch the normal operational mode and the light-load operational mode, and a light-load detection part configured to detect a light-load state of a load, wherein the light-load detection part is configured to detect the light-load state of the load by a change in a voltage at a connection of the switching transistor and the inductor when the switching transistor is OFF, and the operational mode switching part is configured to switch the normal operational mode to the light-load operational mode in response to the detection of the light-load state of the load by the light-load detection part.

Thereby, it is possible to switch the operational mode to the light-load operation mode so as to enable operation with reduced current consumption while preventing an increase in the number of circuits.

Thus, a switching regulator according to one embodiment of the present invention can switch the operational mode to the light-load operation mode so as to operate with reduced current consumption while preventing an increase in the number of circuits.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

According to one aspect of the present invention, a switching regulator includes an operational mode switching part and a light-load detection part. When the inductor current enters a discontinuous current mode, the light-load detection part detects the light-load state of a load and outputs a light-load detection signal. In response to reception of this light-load detection signal, the operational mode switching part switches the operational mode from normal operational mode to light-load operational mode.

First Embodiment

Figure 1:
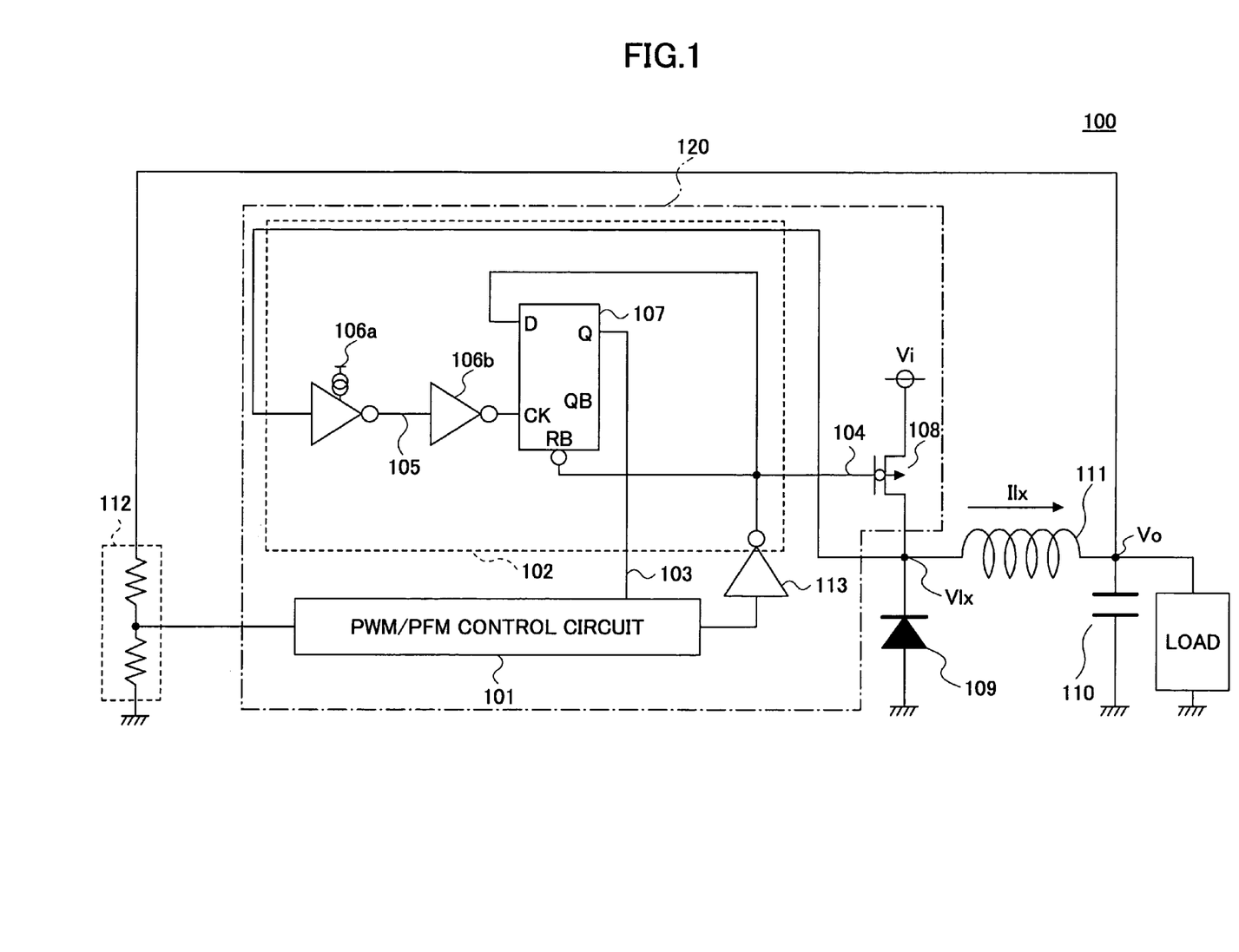
FIG. 1 is a circuit diagram showing a switching regulator according to a first embodiment of the present invention.
Figure 2:
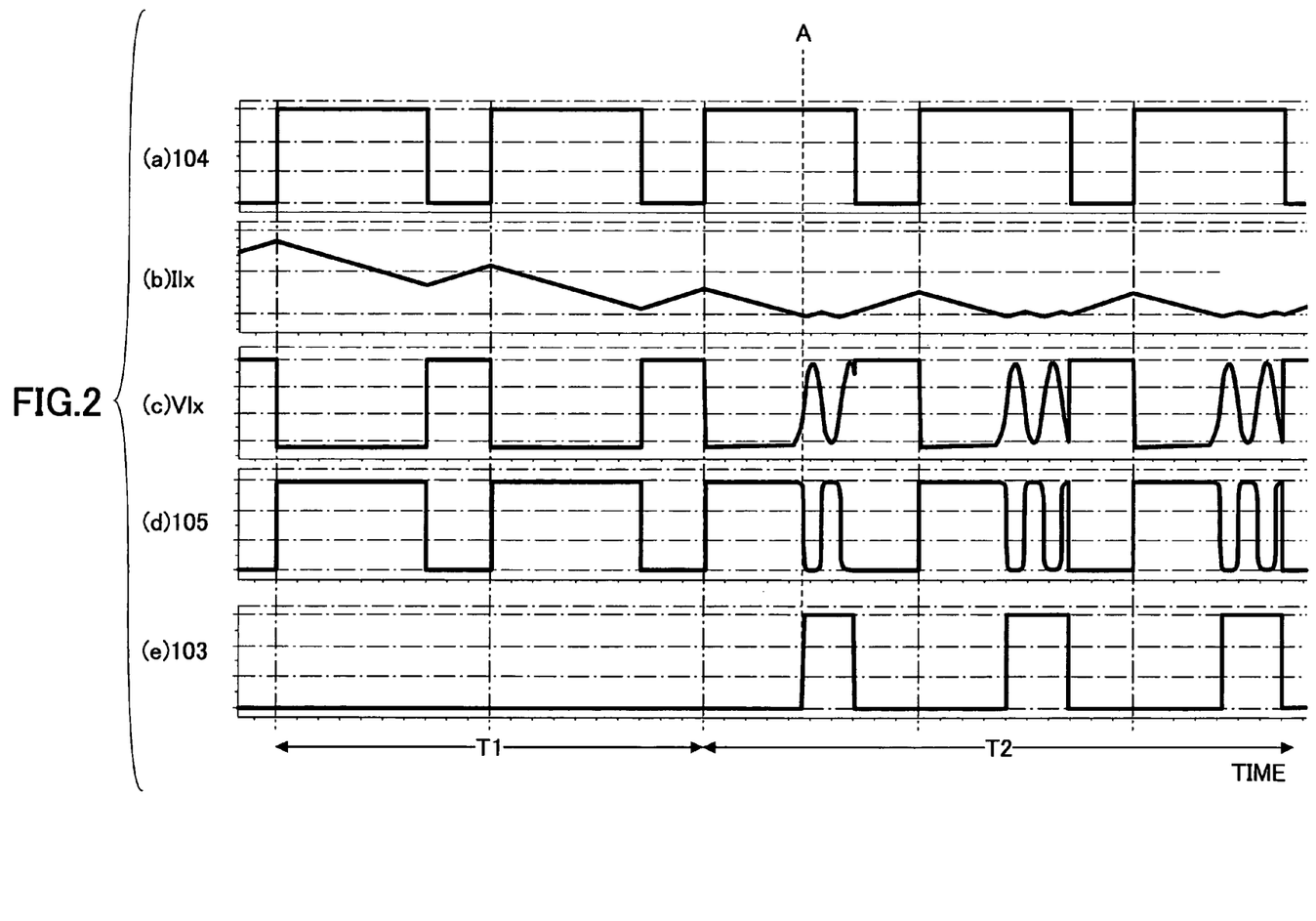
FIG. 2 is a timing chart for illustrating operating waveforms of the switching regulator according to the first embodiment of the present invention.

A description is given below, with reference to FIGS. 1 and 2, of a first embodiment of the present invention. FIG. 1 is a circuit diagram showing a switching regulator 100 according to the first embodiment of the present invention. FIG. 2 is a timing chart for illustrating operating waveforms of the switching regulator 100.

The switching regulator 100 shown in FIG. 1 is a step-down switching regulator, and includes a PWM/PFM control circuit part 101, a light-load detection part 102, a switching transistor 108, a rectifier diode 109, an output capacitor 110, an inductor 111, and a voltage division part 112.

According to the switching regulator 100, when the switching transistor 108 is ON, an output voltage Vo is output from the output terminal, and at the same time, energy corresponding to the input-output potential difference is stored in the inductor 111. When the switching transistor 108 is OFF, the energy stored in the inductor 111 is output from the output terminal as the output voltage Vo. Thereby, the switching regulator 100 outputs stable direct-current voltage.

The control circuit part 101 has a PWM (Pulse-Width Modulation) control mode, which is the normal operational mode of the switching regulator 100 (the operational mode of the switching regulator 100 at the time when the load is in a normal state), and a PFM (Pulse-Frequency Modulation) control mode, which is the light-load operational mode of the switching regulator 100 (the operational mode of the switching regulator 100 at the time when the load is in a light-load state). The control circuit part 101 switches the PWM control mode and the PFM control mode in response to an external signal input thereto.

The input terminal of the control circuit part 101 is connected to the output of the voltage division part 112 so that a voltage proportional to the output voltage Vo is applied to the input terminal of the control circuit part 101. The output terminal of the control circuit part 101 is connected to the gate of the switching transistor 108 through an inverter circuit 113 so that the on-off control of the switching transistor 108 is performed with a control signal 104 output from the control circuit part 101.

The light-load detection part 102 is a logic circuit, and includes a constant-current inverter circuit 106a, an inverter circuit 106b, and a D (delayed) flip-flop circuit 107 (hereinafter, "D-FF 107"). Further, the voltage division part 112 is formed by connecting resistors in series.

A supply voltage Vi is applied to the source of the switching transistor 108, and the drain of the switching transistor 108 is connected to the cathode of the rectifier diode 109. The anode of the rectifier diode 109 is grounded. The control signal 104 is applied to the gate of the switching transistor 108.

One end of the inductor 111 is connected to the connection of the switching transistor 108 and the rectifier diode 109. The other end of the inductor 111 is connected to the output terminal of the switching regulator 100. The output capacitor 110 is connected between the output terminal and ground. Here, the voltage at the connection of the switching transistor 108 and the inductor 111 is shown as Vlx and the inductor current flowing toward the output terminal is shown as Ilx.

Further, the connection of the switching transistor 108 and the inductor 111 is connected to the input of the constant-current inverter circuit 106a. Accordingly, the voltage Vlx serves as an input signal applied to the input terminal of the light-load detection part 102. The output of the constant-current inverter circuit 106a is connected to the clock input (CK in FIG. 1) of the D-FF 107 through the inverter circuit 106b, so that an output signal 105 of the constant-current inverter circuit 106a is inverted by the inverter circuit 106b to be fed to the clock input of the D-FF 107.

The same control signal as the control signal 104 fed to the switching transistor 108 is fed to the input (D in FIG. 1) and the reset input (RB in FIG. 1) of the D-FF 107. The output (Q in FIG. 1) of the D-FF 107 is connected to the control circuit part 101 so that the output signal of the D-FF signal 107 is fed as an output signal 103 of the light-load detection part 102 to the control circuit part 101. The D-FF 107 of this embodiment is reset in response to application of a low-level (LOW) signal to the reset terminal thereof.

The control circuit part 101 switches the operational mode in response to reception of the output signal 103 from the light-load detection part 102. In this embodiment, when the control circuit part 101 receives a high-level (HIGH) signal from the light-load detection part 102, the control circuit part 101 determines this high-level signal as a light-load detection signal, and switches the operational mode from the normal operational mode to the light-load operational mode.

Next, a description is given, with reference to FIG. 2, of an operation of the switching regulator 100. FIG. 2 shows operating waveforms (a) through (e) in a period T1 of the continuous current mode of the inductor current Ilx, shown in (b) of FIG. 2, where the inductor current Ilx does not become zero, and in a period T2 of the discontinuous current mode of the inductor current Ilx, where the inductor current Ilx becomes zero.

In the switching regulator 100, when the switching transistor 108 is ON, the voltage Vlx, shown in (c) of FIG. 2, is always HIGH (high-level) irrespective of whether the inductor current Ilx is in continuous current mode or discontinuous current mode. Further, when the switching transistor 108 is ON, a low-level signal is applied to the reset input of the D-FF 107, so that the D-FF 107 is reset. Accordingly, the output signal of the D-FF 107 at this time, that is, the output signal 103 of the light-load detection part 102, shown in (e) of FIG. 2, is kept LOW, so that the control circuit part 101 does not switch the operational mode.

Accordingly, a description is given herein of an operation of the switching regulator 100 in the case where the switching transistor 108 is OFF.

First, a description is given below of an operation of the switching regulator 100 in the period of the continuous current mode of the inductor current Ilx (the period T1 of FIG. 2). In the continuous current mode, the inductor current Ilx constantly flows in the output direction. When the control signal 104, shown in (a) of FIG. 2, is HIGH, that is, when the switching transistor 108 is OFF, the rectifier diode 109 constantly causes current to flow in the forward direction from the ground side. Accordingly, the cathode voltage of the rectifier diode 109, that is, the voltage Vlx, is always LOW. Technically speaking, at this point, the cathode voltage of the rectifier diode 109 is dropped by the forward voltage of the rectifier diode 109.

Therefore, when the control signal 104 is HIGH, a low-level voltage is constantly applied to the input of the constant-current inverter circuit 106a, so that no clock signal is applied to the D-FF 107. Accordingly, the output signal of the D-FF 107, that is, the output signal 103 of the light-load detection part 102, is kept LOW, so that the output signal 103 is prevented from becoming HIGH.

Therefore, in the continuous current mode of the inductor current Ilx, the control circuit part 101 constantly operates in the PWM control mode, which is the normal operational mode, and does not switch the operational mode to the light-load operational mode.

Next, a description is given below of an operation of the switching regulator 100 in the period of the discontinuous current mode of the inductor current Ilx (the period T2 of FIG. 2). In the discontinuous current mode, when the control signal 104 is HIGH, that is, when the switching transistor 108 is OFF, the inductor current Ilx tries to flow in the direction opposite to the output direction because of the counter electromotive force of the inductor 111. Here, however, the action of the rectifier diode 109 prevents the inductor current Ilx from flowing in the ground direction, so that the voltage Vlx is floating.

Then, the inductor 111 and the drain capacitance of the switching transistor 108 cause the voltage Vlx to start LC oscillation. The initial state of this LC oscillation is a sinusoidal wave of the same amplitude and offset voltage as the output voltage Vo. Accordingly, if the output voltage Vo at this point is greater than or equal to the half of the supply voltage Vi, the voltage Vlx oscillates between HIGH (high level) and LOW (low level). Here, this oscillation is described as LC oscillation for convenience. Technically speaking, however, the oscillation is LCR oscillation because of the parasitic resistance of an interconnection line.

Here, the voltage Vlx is applied to the input of the constant-current inverter circuit 106a. The voltage Vlx is amplified and binarized by the constant-current inverter circuit 106a to be output as the output signal 105, shown in (d) of FIG. 2. This output signal 105 is inverted by the inverter circuit 106b to be the clock input signal of the D-FF 107.

For example, the voltage Vlx is HIGH at a point A shown in FIG. 2. When the voltage Vlx becomes HIGH, this high-level signal is applied to the constant-current inverter circuit 106a, so that the output signal 105 becomes LOW. Here, the output signal 105 is inverted by the inverter circuit 106b to be applied to the clock input of the D-FF 107. That is, a high-level signal is applied to the clock input of the D-FF 107. Then, the output signal of the D-FF 107, that is, the output signal 103 of the light-load detection part 102, becomes HIGH, and this high-level signal is input to the control circuit part 101 as a light-load detection signal.

In response to reception of this light-load detection signal, the control circuit part 101 switches the operational mode from the PWM control mode, which is the normal operational mode, to the PFM control mode, which is the light-load operational mode. Then, the control circuit part 101 causes the switching regulator 100 to operate in the PFM control mode from when the switching transistor 108 is turned ON next.

Thus, in the switching regulator 100, with the switching transistor 108 being OFF, the light-load state of the load is detected by the change in the voltage Vlx at the connection of the switching transistor 108 and the inductor 111, and the operational mode is automatically switched to the PFM control mode, which is the light-load operational mode. Using this light-load operational mode makes it possible to improve the operational efficiency of the switching regulator 100 at a light-load time. Further, since the light-load detection part 102 is formed of a logic circuit, it is possible to reduce the driving current of the light-load detection part 102 and to prevent an increase in the number of circuits. Further, since the light-load detection part 102 is higher in response speed than the conventional analog circuit, it is possible to achieve high-speed response to a change in the voltage Vlx.

Further, according to this embodiment, the control circuit part 101, the light-load detection part 102, the switching transistor 108, and the inverter circuit 113 are disposed on the same substrate as a semiconductor integrated circuit 120. Since the control circuit part 101, the light-load detection part 102, the switching transistor 108, and the inverter circuit 113 are integrated into the semiconductor integrated circuit 120, it is possible to reduce the number of input and output terminals of the switching regulator 100, so that it is possible to reduce the wiring resistance between circuit elements. Accordingly, it is possible to reduce current consumption. Further, using a constant-current inverter circuit for an inverter circuit makes it possible to eliminate current consumed in the inverter circuit, so that it is possible to reduce current consumption.

Further, according to this embodiment, when the PWM control mode, which is the normal operational mode, is switched to the PFM control mode, which is the light-load operational mode, it is preferable to stop the operations of circuit elements that are used only in the PWM control mode, such as a slope circuit and an oscillator circuit, in order to further reduce current consumption.

Further, it is preferable to use the same error amplifier and comparator in the PFM control mode and the PWM control mode. Using the same circuit elements makes it possible to prevent an increase in the number of circuits. Further, this also makes it possible to prevent a variation in the output voltage due to the offset voltage difference between circuit elements, so that it is possible to provide a switching regulator having good accuracy.

Second Embodiment

Figure 3:
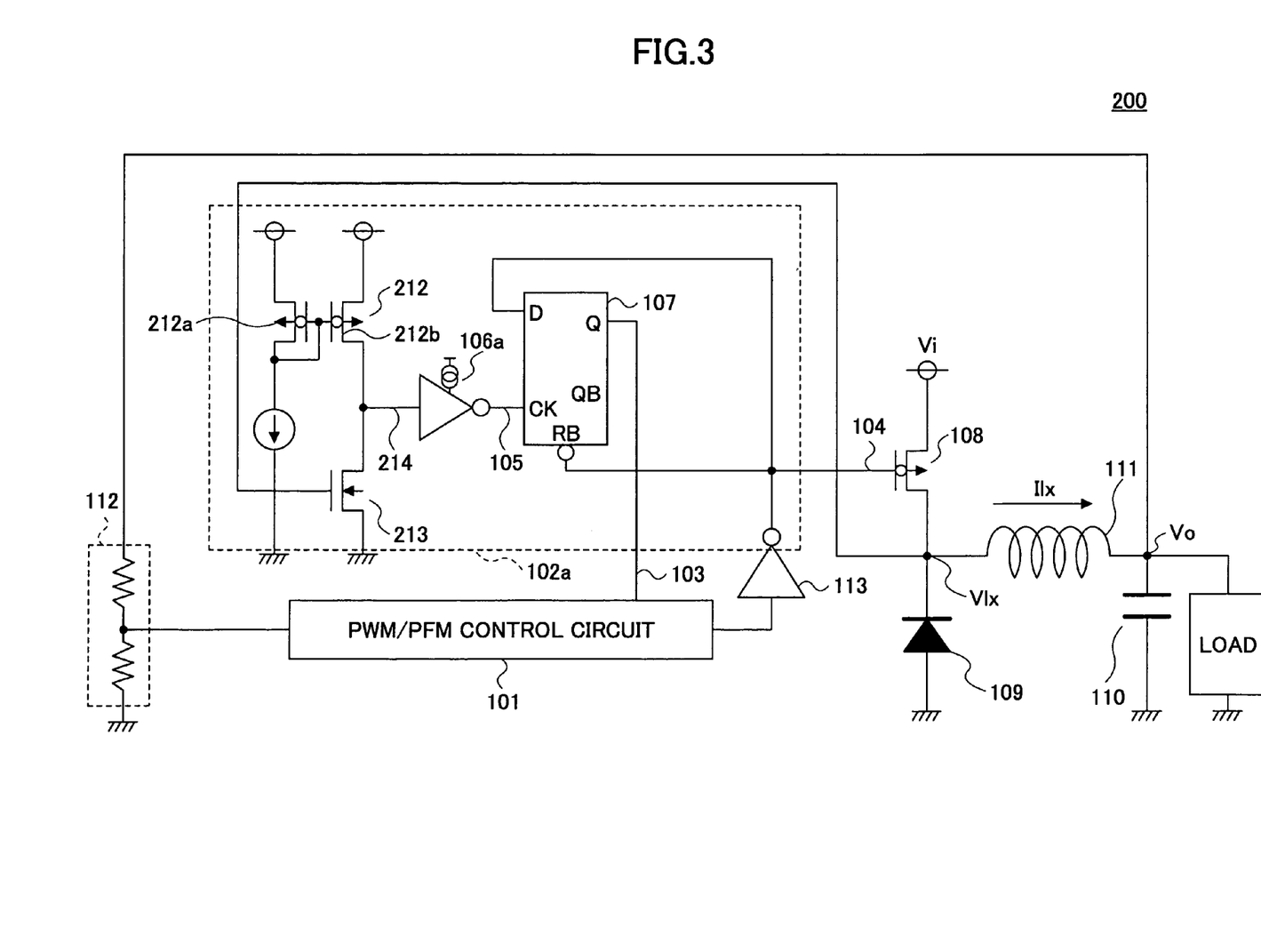
FIG. 3 is a circuit diagram showing a switching regulator according to a second embodiment of the present invention.
Figure 4:
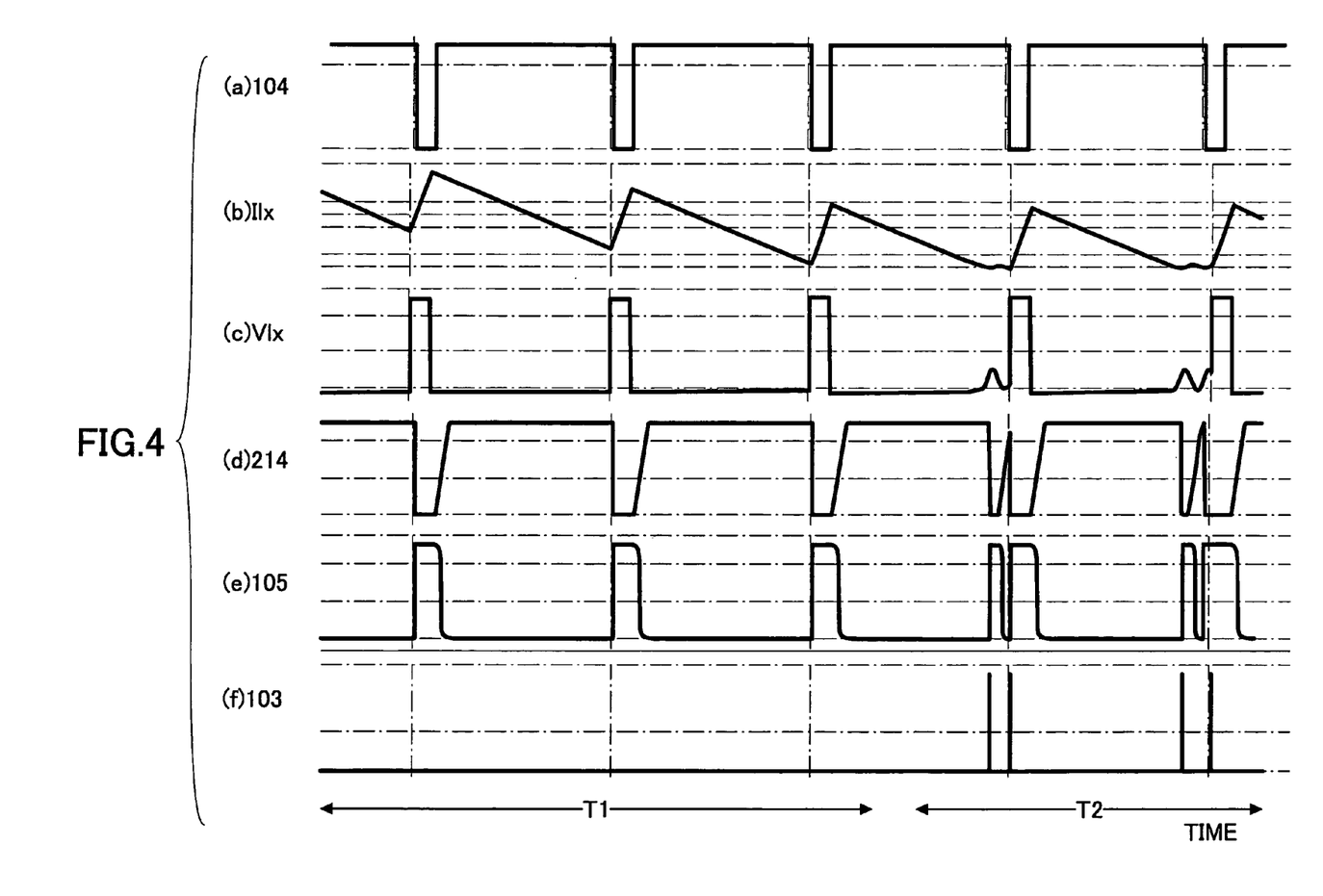
FIG. 4 is a timing chart for illustrating operating waveforms of the switching regulator according to the second embodiment of the present invention.

A description is given below, with reference to FIGS. 3 and 4, of a second embodiment of the present invention. FIG. 3 is a circuit diagram showing a switching regulator 200 according to the second embodiment of the present invention. FIG. 4 is a timing chart for illustrating operating waveforms of the switching regulator 200.

The switching regulator 200 of the second embodiment is formed by providing a circuit that inverts and amplifies the voltage Vlx in the light-load detection part 102 of the switching regulator 100 of the first embodiment. In the switching regulator 200 of the second embodiment shown in FIG. 3, the elements having the same configurations or functions as those of the switching regulator 100 shown in FIG. 1 are referred to by the same reference numerals, and a description thereof is omitted. Further, the second embodiment is different from the first embodiment in the configuration of the light-load detection part. Accordingly, a description is given below of the difference in configuration between a light-load detection part 102a of the switching regulator 200 and the light-load detection part 102 of the switching regulator 100 of the first embodiment.

The switching regulator 200 of the second embodiment includes the light-load detection part 102a, which includes the constant-current inverter circuit 106a, the D-FF 107, and an NMOS transistor 213 having its drain connected to a current source 212.

The source of the NMOS transistor 213 is grounded, and the voltage Vlx at the connection of the switching transistor 108 and the inductor 111 is applied to the gate of the NMOS transistor 213. This voltage Vlx is inverted and amplified by the current source 212 and the NMOS transistor 213 to be applied as an output signal 214 to the input of the constant-current inverter circuit 106a.

The current source 212 is a current mirror circuit formed of two PMOS transistors 212a and 212b. The gates of the PMOS transistors 212a and 212b are connected in common, and the source of each of the PMOS transistors 212a and 212b is connected to a current source.

The drain of the PMOS transistor 212a is grounded, and the drain of the PMOS transistor 212b is connected to the drain of the NMOS transistor 213. The connection of the PMOS transistor 212b and the NMOS transistor 213, that is, the connection of the current source 212 and the NMOS transistor 213, is connected to the input of the constant-current inverter circuit 106a.

The output signal 214 applied to the constant-current inverter circuit 106a becomes LOW (low-level) when the voltage Vlx applied to the gate of the NMOS transistor 213 exceeds the threshold level of the NMOS transistor 213.

Next, a description is given, with reference to FIG. 4, of an operation of the switching regulator 200. FIG. 4 shows operating waveforms (a) through (f) in a period T1 of the continuous current mode of the inductor current Ilx, shown in (b) of FIG. 4, where the inductor current Ilx does not become zero, and in a period T2 of the discontinuous current mode of the inductor current Ilx, where the inductor current Ilx becomes zero.

The switching regulator 200 is different in operation from the switching regulator 100 described in the first embodiment only when the output voltage Vo at the time of the discontinuous current mode of the inductor current Ilx is low. Accordingly, a description is given below of the operation different from that of the switching regulator 100.

When the output voltage Vo of the switching regulator 200 is low in the discontinuous current mode of the inductor current Ilx, the amplitude in the LC oscillation of the voltage Vlx, shown in (c) of FIG. 4, is small. In this case, the constant-current inverter circuit 106a cannot detect a change in the voltage Vlx. Accordingly, the light-load detection part 102a inverts and amplifies this voltage Vlx with the current source 212 and the NMOS transistor 213, thereby detecting the light-load state of the load from a change in the voltage Vlx.

When the voltage Vlx varies because of LC oscillation to exceed the threshold level of the NMOS transistor 213, the output signal 214, shown in (d) of FIG. 4, becomes LOW. This low-level signal is further inverted and amplified, and also binarized by the constant-current inverter circuit 106a to be the high-level output signal 105, shown in (e) of FIG. 4, and applied to the clock input of the D-FF 107 as a clock signal.

When the clock signal is input to the D-FF 107, the output signal of the D-FF 107, that is, the output signal 103 of the light-load detection part 102a, shown in (f) of FIG. 4, becomes HIGH, and this high-level signal is input to the control circuit part 101. The control circuit part 101 determines this high-level signal as a light-load detection signal, and in response to the reception of this signal, switches the operational mode from the normal operational mode to the light-load operational mode.

Thus, according to the second embodiment, it is possible to detect the light-load state of the load even when the output voltage Vo is low. Further, the other forms or configurations described in the first embodiment are also applicable in this embodiment. Further, the other effects described in the first embodiment can also be produced according to the second embodiment.

Third Embodiment

Figure 5:
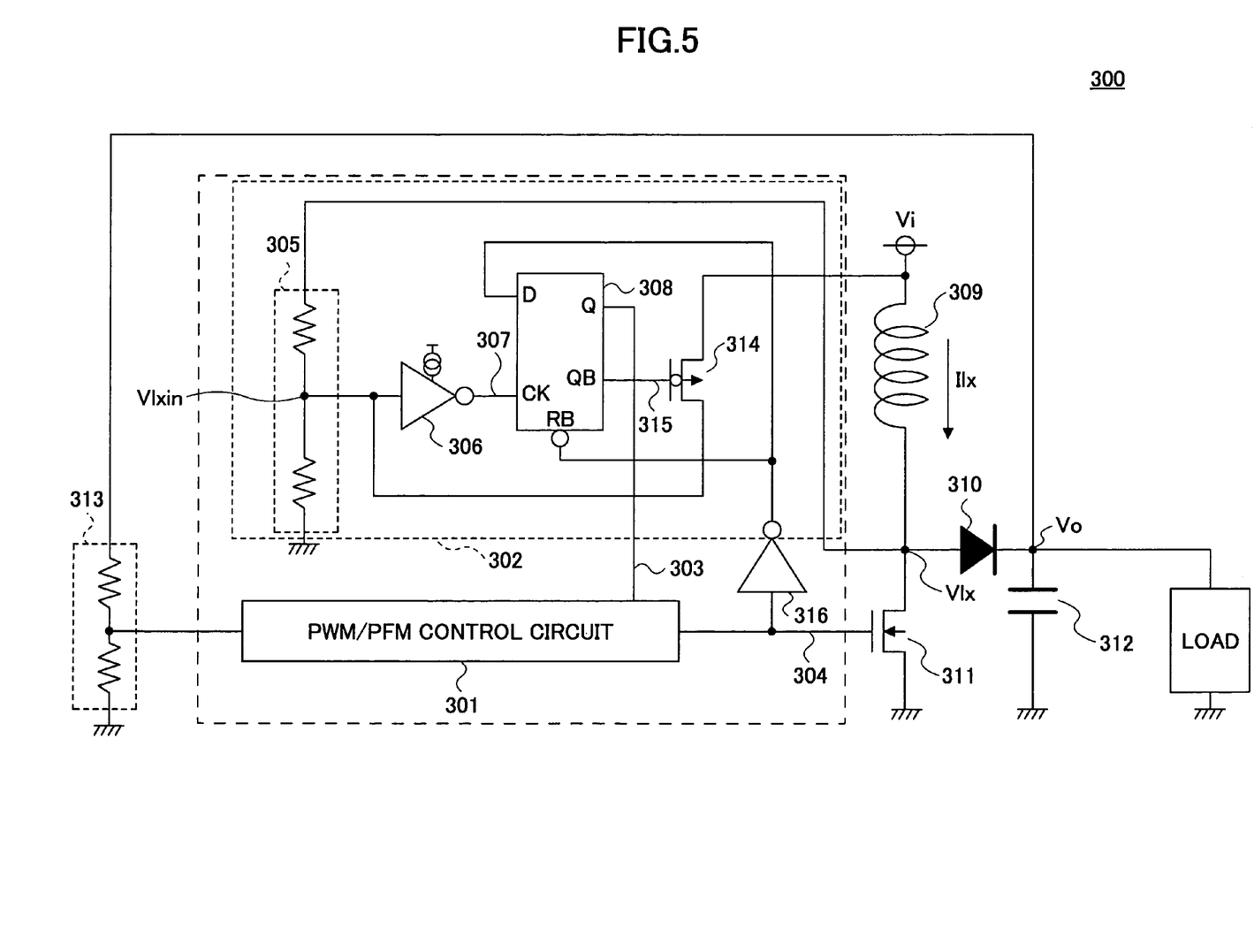
FIG. 5 is a circuit diagram showing a switching regulator according to a third embodiment of the present invention.
Figure 6:
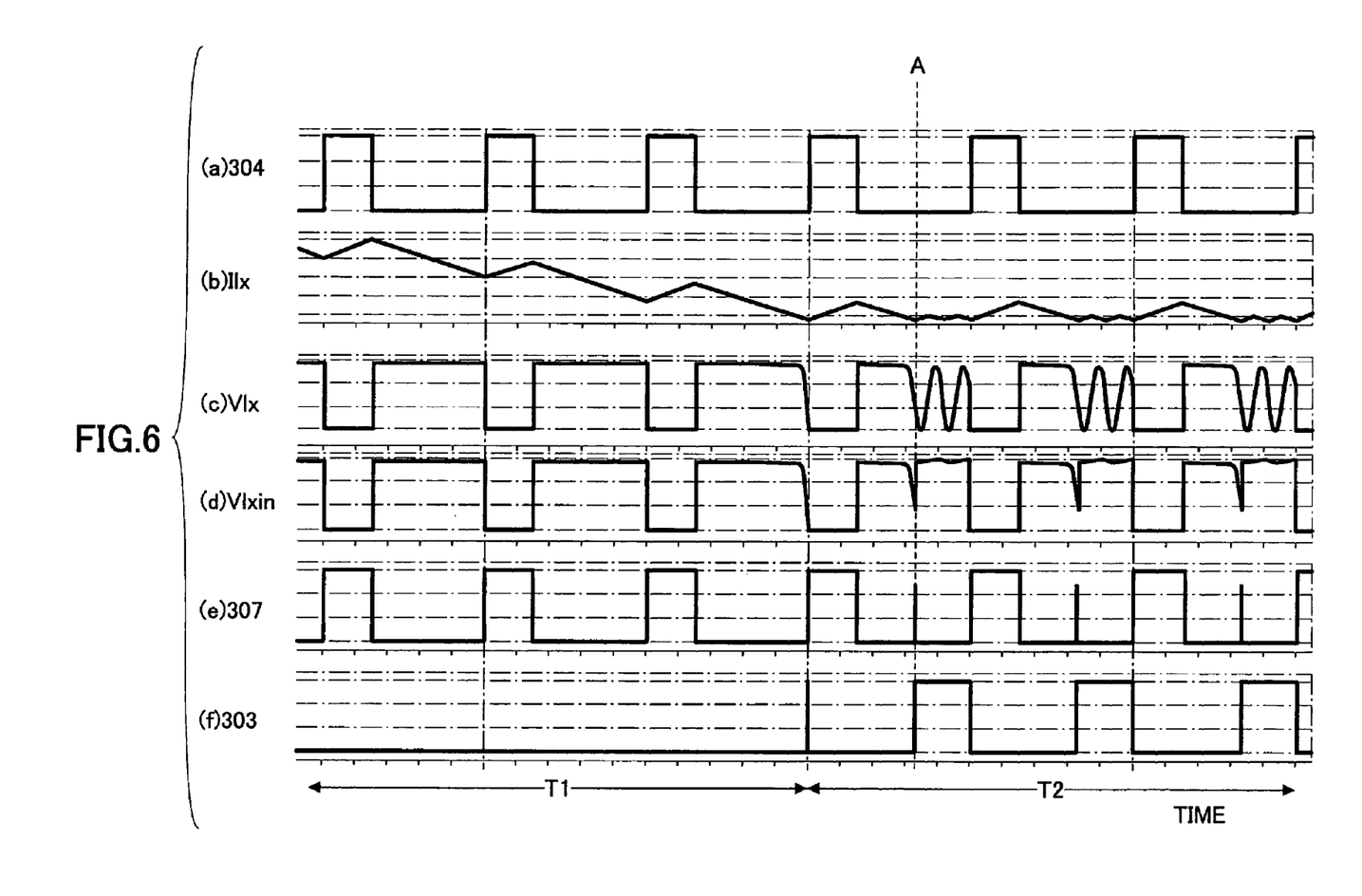
FIG. 6 is a timing chart for illustrating operating waveforms of the switching regulator according to the third embodiment of the present invention.

A description is given below, with reference to FIGS. 5 and 6, of a third embodiment of the present invention. FIG. 5 is a circuit diagram showing a switching regulator 300 according to the third embodiment of the present invention. FIG. 6 is a timing chart for illustrating operating waveforms of the switching regulator 300.

The switching regulator 300 shown in FIG. 5 is a step-up switching regulator, and includes a PWM/PFM control circuit part 301, a light-load detection part 302, an inductor 309, a rectifier diode 310, a switching transistor 311, an output capacitor 312, and a voltage division part 313.

According to the switching regulator 300, when the switching transistor 311 is ON, an output voltage Vo is output from the output terminal, and at the same time, energy corresponding to the input-output potential difference is stored in the inductor 309. When the switching transistor 311 is OFF, the energy stored in the inductor 309 is output from the output terminal as the output voltage Vo. Thereby, the switching regulator 300 outputs stable direct-current voltage.

The control circuit part 301 and the voltage division part 313 are equal in function and configuration to the control circuit part 101 and the voltage division part, respectively, of the first embodiment, and accordingly, a description thereof is omitted.

The input terminal of the control circuit part 301 is connected to the output of the voltage division part 313 so that a voltage proportional to the output voltage Vo is applied to the input terminal of the control circuit part 301. The output terminal of the control circuit part 301 is connected to the gate of the switching transistor 311 so that the on-off control of the switching transistor 311 is performed with a control signal 304 output from the control circuit part 301.

The light-load detection part 302, which is a logic circuit, includes a voltage division part 305 having resistors connected in series, a constant-current inverter circuit 306, a D-FF 308, and a switching device 314.

The source of the switching transistor 311 is grounded, and the drain of the switching transistor 311 is connected to the anode of the rectifier diode 310. The control signal 304 from the control circuit part 301 is applied to the gate of the switching transistor 311. The cathode of the rectifier diode 310 is connected to the output terminal of the switching regulator 300, and the output capacitor 312 is connected between the output terminal and ground.

One end of the inductor 309 is connected to the connection of the switching transistor 311 and the rectifier diode 310. A supply voltage Vi is applied to the other end of the inductor 309. Here, the voltage at the connection of the switching transistor 311 and the inductor 309 is shown as Vlx and the inductor current flowing toward the output terminal is shown as Ilx.

Further, the connection of the switching transistor 311 and the inductor 309 is connected to one end of the voltage division part 305 having the other end thereof grounded. The output of the voltage division part 305 is connected to the input of the constant-current inverter circuit 306. Accordingly, the voltage Vlx serves as an input signal applied to the input terminal of the light-load detection part 302.

The voltage Vlx, which is the input signal to the light-load detection part 302, is divided by the voltage division part 305 so that a voltage Vlxin proportional to the voltage Vlx is generated. This voltage Vlxin serves as an input signal applied to the input of the constant-current inverter circuit 306.

The voltage Vlxin is inverted and amplified by the constant-current inverter circuit 306 to be output from its output as a binary output signal 307. This output signal 307 is applied as a clock signal to the clock input of the D-FF 308. The control signal 304 output from the control circuit 301 is inverted by an inverter circuit 316 to be fed to the D input and the reset input of the D-FF 308. The output of the D-FF 308 is connected to the control circuit part 301, so that the output signal of the D-FF 308 is fed as an output signal 303 of the light-load detection part 302 to the control circuit part 301. The D-FF 308 of this embodiment is reset in response to application of a low-level signal to the reset input thereof.

The control circuit part 301 switches the operational mode in response to reception of the output signal 303 from the light-load detection part 302. In this embodiment, when the control circuit part 301 receives a high-level signal from the light-load detection part 302, the control circuit part 301 determines this high-level signal as a light-load detection signal, and switches the operational mode from the normal operational mode to the light-load operational mode.

Next, a description is given, with reference to FIG. 6, of an operation of the switching regulator 300. FIG. 6 shows operating waveforms (a) through (f) in a period T1 of the continuous current mode of the inductor current Ilx, shown in (b) of FIG. 6, where the inductor current Ilx does not become zero, and in a period T2 of the discontinuous current mode of the inductor current Ilx, where the inductor current Ilx becomes zero.

In the switching regulator 300, when the switching transistor 311 is ON, the voltage Vlx, shown in (c) of FIG. 6, is always LOW (low-level) irrespective of whether the inductor current Ilx is in continuous current mode or discontinuous current mode. Further, when the switching transistor 311 is ON, a low-level signal is applied to the reset input of the D-FF 308, so that the D-FF 308 is reset. Accordingly, the output signal of the D-FF 308 at this time, that is, the output signal 303 of the light-load detection part 302, shown in (f) of FIG. 6, is kept LOW, so that the control circuit part 301 does not switch the operational mode.

Accordingly, a description is given herein of an operation of the switching regulator 300 in the case where the switching transistor 311 is OFF.

First, a description is given below of an operation of the switching regulator 300 in the period of the continuous current mode of the inductor current Ilx (the period T1 of FIG. 6). In the continuous current mode, the inductor current Ilx constantly flows in the output terminal direction. When the control signal 304, shown in (a) of FIG. 6, is LOW, that is, when the switching transistor 311 is OFF, the rectifier diode 310 constantly causes current to flow in the forward direction from the supply voltage side. Accordingly, the anode voltage of the rectifier diode 310, that is, the voltage Vlx, is always equal to the output voltage Vo. Technically speaking, at this point, the anode voltage of the rectifier diode 310 is dropped by the forward voltage of the rectifier diode 310.

Therefore, when the control signal 304 is LOW, a high-level voltage is constantly applied to the input of the constant-current inverter circuit 306, so that the constant-current inverter circuit 306 outputs the low-level signal 307, shown in (e) of FIG. 6. This low-level output signal 307 serves as the clock signal of the D-FF 308. Accordingly, the output signal of the D-FF 308, that is, the output signal 303 of the light-load detection part 302, is kept LOW, so that the output signal 303 is prevented from becoming HIGH.

Therefore, in the continuous current mode of the inductor current Ilx, since the control circuit part 301 receives no light-load detection signal, the control circuit part 301 constantly operates in the PWM control mode, which is the normal operational mode, and does not switch the operational mode to the light-load operational mode.

Next, a description is given below of an operation of the switching regulator 300 in the period of the discontinuous current mode of the inductor current Ilx (the period T2 of FIG. 6). In the discontinuous current mode, when the control signal 304 is LOW, that is, when the switching transistor 311 is OFF, the inductor current Ilx tries to flow in the direction opposite to the output direction because of the counter electromotive force of the inductor 309. Here, however, the action of the rectifier diode 310 prevents the inductor current Ilx from flowing in the power supply direction, so that the voltage Vlx is floating.

Then, the inductor 309 and the drain capacitance of the switching transistor 311 cause the voltage Vlx to start LC oscillation. The initial state of this LC oscillation is a sinusoidal wave of an amplitude of (Vo−Vi) and an offset voltage equal to the supply voltage Vi. Accordingly, if the supply voltage Vi at this point is greater than or equal to the half of the output voltage Vo, the voltage Vlx oscillates between HIGH (high level) and LOW (low level). Here, this oscillation is described as LC oscillation for convenience. Technically speaking, however, the oscillation is LCR oscillation because of the parasitic resistance of an interconnection line.

This voltage Vlx is divided by the voltage division part 305 so that the appropriate voltage Vlxin, shown in (d) of FIG. 6, is generated, and the voltage Vlxin is applied to the input of the constant-current inverter circuit 306. Thus, by causing the voltage Vlx to go through the voltage division part 305, it is possible to prevent direct application of high voltage to the constant-current inverter circuit 306, which is a logic circuit. Therefore, in the case where the logic circuit forming the light-load detection part 302 is a semiconductor integrated circuit, it is possible to prevent failure of the semiconductor integrated circuit due to high voltage application. Further, the appropriate voltage Vlxin described herein is preferably, for example, such that the high level of the voltage Vlx is substantially the same as the supply voltage of the logic circuit of the light-load detection part 302.

The voltage Vlxin is amplified and binarized by the constant-current inverter circuit 306 to be output as the output signal 307. This output signal 307 serves as the clock input signal of the D-FF 308.

For example, the voltage Vlx is LOW at a point A shown in FIG. 6. When the voltage Vlx is LOW, the voltage Vlxin is also LOW, and this low-level voltage Vlxin is applied to the constant-current inverter circuit 306. Then, the output signal 307 of the constant-current inverter circuit 306 becomes HIGH, and this high-level output signal 307 is applied to the clock input of the D-FF 308. Then, the output signal of the D-FF 308, that is, the output signal 303 of the light-load detection part 302, becomes HIGH, and this high-level signal is input to the control circuit part 301 as a light-load detection signal.

In response to reception of this light-load detection signal, the control circuit part 301 switches the operational mode from the PWM control mode, which is the normal operational mode, to the PFM control mode, which is the light-load operational mode. Then, the control circuit part 301 causes the switching regulator 300 to operate in the PFM control mode from when the switching transistor 311 is turned ON next.

Here, a description is given below of an operation and a function of the switching device 314. According to this embodiment, the switching device 314 is a PMOS transistor.

The switching device 314 is provided between the power supply and the output of the voltage division part 305. The supply voltage Vi is applied to one end of the switching device 314, and the voltage Vlxin is applied to the other end of the switching device 314. An inverted output signal 315, which is the inversion of the output signal of the D-FF 308, is applied to the gate of the switching element 314, so that the on-off control of the switching device 314 is performed with this inverted output signal 315.

The switching device 314 is turned ON when the inverted output signal 315 becomes LOW, that is, when the light-load detection part 302 detects the light-load state of the load. When the switching device 314 is turned ON, the voltage Vlxin is fixed to the supply voltage Vi. Accordingly, even if the voltage Vlx starts oscillation after the light-load detection part 302 once detects the light-load state of the load, the constant-current inverter circuit 306 is prevented from unnecessarily performing HIGH (high-level)/LOW (low-level) switching because the voltage Vlxin is fixed. Accordingly, no current is consumed in the constant-current inverter circuit 306, so that it is possible to further reduce the current consumption of the switching regulator 300.

Alternatively, the switching device 314 may be provided between the output of the voltage division part 305 and ground. In this case, when the switching device 314 is turned ON, the voltage Vlxin is fixed to the voltage between the output of the voltage division part 305 and ground, so that it is possible to stop unnecessary HIGH/LOW switching of the constant-current inverter circuit 306 the same as in this embodiment. At this point, it may be determined based on the resistance ratio of the resistors of the voltage division part 305 whether the voltage Vlxin is fixed to the supply voltage Vi or to the voltage between the output of the voltage division part 305 and ground, and the voltage Vlxin may be fixed to one of the supply voltage Vi and the voltage between the output of the voltage division part 305 and ground, which one consumes less current.

Further alternatively, for example, the switching device 314 may be an NMOS transistor, and the output signal of the D-FF 308 may be applied to the gate of the switching device 314.

Further alternatively, for example, the switching regulator 300 may dispense with the voltage division part 305, and the switching device 314 may be provided between the power supply and the connection of the switching transistor 311 and the inductor 309. In this case, by fixing one end of the switching device 314 to the supply voltage Vi, it is possible to have the voltage Vlx fixed to the supply voltage Vi. Accordingly, after once the light-load state of the load is detected, it is possible to stop LC oscillation in the voltage Vlx.

Thus, according to this embodiment, it is possible to stop an unnecessary operation of the constant-current inverter circuit 306 in the light-load detection part 302 in the light-load operational mode, so that it is possible to reduce current consumption of the switching regulator 300. Further, the other forms or configurations described in the first and second embodiments may be applied in this embodiment. Further, the other effects described in the first and second embodiments can also be produced according to this embodiment.

According to one embodiment of the present invention, there is provided a switching regulator including an inductor and a switching transistor, the switching regulator having a normal operational mode and a light-load operational mode, the switching regulator including an operational mode switching part configured to switch the normal operational mode and the light-load operational mode, and a light-load detection part configured to detect a light-load state of a load, wherein the light-load detection part is configured to detect the light-load state of the load by a change in a voltage at a connection of the switching transistor and the inductor when the switching transistor is OFF, and the operational mode switching part is configured to switch the normal operational mode to the light-load operational mode in response to the detection of the light-load state of the load by the light-load detection part.

Thereby, it is possible to switch the operational mode to the light-load operation mode so as to enable operation with reduced current consumption while preventing an increase in the number of circuits.

Additionally, in the above-described switching regulator, the normal operational mode may be a pulse-width modulation control mode, and the light-load operational mode may be a pulse-frequency modulation operational mode.

Thus, by switching the operational mode to a PFM control mode of good control efficiency and low current consumption at a light-load time, it is possible to reduce power consumption at the light-load time.

Additionally, in the above-described switching regulator, the light-load detection part may include a flip-flop circuit, the connection of the switching transistor and the inductor may be connected to the clock input of the flip-flop circuit, and a control signal provided to the gate of the switching transistor may be provided to the input and the reset input of the flip-flop circuit.

Thus, by using a flip-flop circuit, which is a logic circuit, for the light-load detection part, it is possible to detect the light-load state of the load while reducing current consumption.

Additionally, in the above-described switching regulator, the light-load detection part may include an inverter circuit provided between the connection of the switching transistor and the inductor and the flip-flop circuit, and the inverter circuit may be a constant-current inverter.

By using a constant-current inverter for the inverter circuit, it is possible to reduce current consumption of the inverter circuit, and to generate a clock signal to be input to the clock input of the flip-flop circuit.

Additionally, the above-described switching regulator may be a step-up type, wherein the light-load detection part may include a switching device connected between the connection of the switching transistor and the inductor and one of a power supply and ground, and the on-off control of the switching device is performed with the output signal of the flip-flop circuit.

Thereby, it is possible to fix the voltage at the connection of the switching transistor and the inductor to, for example, a supply voltage after the light-load detection part once detects the discontinuous current mode of an inductor current.

Additionally, in the above-described switching regulator, the light-load detection part may include a voltage division part configured to divide the voltage at the connection of the switching transistor and the inductor; and the switching device may be connected between the output of the voltage division part and the one of the power supply and the ground.

Thereby, it is possible to reduce the voltage at the connection of the switching transistor and the inductor to an appropriate voltage, and to cause the appropriate voltage to serve as the clock input signal of the flip-flop circuit.

Additionally, in the above-described switching regulator, the light-load detection part may include a transistor, the transistor having a first terminal grounded, a second terminal connected to a current source, and a third terminal serving as a gate, and the voltage at the connection of the switching transistor and the inductor may be applied to the third terminal of the transistor.

Thereby, it is possible to generate a clock signal to be input to the clock input of the flip-flop circuit even in the case of low output voltage.

Additionally, in the above-described switching regulator, the switching transistor, the light-load detection part, and the operational mode switching part may be integrated into a semiconductor integrated circuit.

By containing the switching transistor, the light-load detection part, and the operational mode switching part in a semiconductor integrated circuit, it is possible to monitor the voltage at the connection of the switching transistor and the inductor inside the semiconductor integrated circuit, it is possible to prevent an increase in the number of terminals of the semiconductor integrated circuit.

Thus, a switching regulator according to one embodiment of the present invention can switch the operational mode to the light-load operation mode so as to operate with reduced current consumption while preventing an increase in the number of circuits.

The present invention may be applied to switching regulators for low current consumption.

The present invention is not limited to the specifically disclosed embodiments, and variations and modifications may be made without departing from the scope of the present invention.

The present application is based on Japanese Priority Patent Application No. 2006-073402, filed on Mar. 16, 2006, the entire contents of which are hereby incorporated by reference.

What is claimed is:

1. A switching regulator including an inductor and a switching transistor, the switching regulator having a normal operational mode and a light-load operational mode, the switching regulator comprising:
    an operational mode switching part configured to switch the normal operational mode and the light-load operational mode; and
    a light-load detection part configured to detect a light-load state of a load,
    wherein the light-load detection part is configured to detect the light-load state of the load by a change in a voltage at a connection of the switching transistor and the inductor when the switching transistor is OFF,
    the operational mode switching part is configured to switch the normal operational mode to the light-load operational mode in response to the detection of the light-load state of the load by the light-load detection part,
    the light-load detection part comprises a flip-flop circuit,
    the connection of the switching transistor and the inductor is connected to a clock input of the flip-flop circuit, and
    a control signal provided to a gate of the switching transistor is provided to an input of the flip-flop circuit and a reset input of the flip-flop circuit.

2. The switching regulator as claimed in claim 1, wherein the normal operational mode is a pulse-width modulation control mode, and the light-load operational mode is a pulse-frequency modulation operational mode.

3. The switching regulator as claimed in claim 1, wherein:
    the light-load detection part comprises an inverter circuit provided between the connection of the switching transistor and the inductor and the flip-flop circuit, and the inverter circuit comprises a constant-current inverter.

4. The switching regulator as claimed in claim 1, wherein:
    the switching regulator is a step-up type, the light-load detection part comprises a switching device connected between the connection of the switching transistor and the inductor and one of a power supply and ground, and an on-off control of the switching device is performed with an output signal of the flip-flop circuit.

5. The switching regulator as claimed in claim 4, wherein:
    the light-load detection part comprises a voltage division part configured to divide the voltage at the connection of the switching transistor and the inductor, and the switching device is connected between an output of the voltage division part and the one of the power supply and the ground.

6. The switching regulator as claimed in claim 1, wherein:
    the light-load detection part comprises a transistor, the transistor having a first terminal grounded, a second terminal connected to a current source, and a third terminal serving as a gate, and the voltage at the connection of the switching transistor and the inductor is applied to the third terminal of the transistor.

7. The switching regulator as claimed in claim 1, wherein the switching transistor, the light-load detection part, and the operational mode switching part are integrated into a semiconductor integrated circuit.

* * * * *